(12) United States Patent
Pigeon

(10) Patent No.: US 10,008,031 B1
(45) Date of Patent: Jun. 26, 2018

(54) HEAT RENDERING IN AN INTERACTIVE COMPUTER SIMULATION SYSTEM

(71) Applicant: CAE Inc., Saint-Laurent (CA)

(72) Inventor: Michel Pigeon, Montréal (CA)

(73) Assignee: CAE INC., Saint-Laurent, QC (CA)

(*) Notice: Subject to any disclaimer, the term of this patent is extended or adjusted under 35 U.S.C. 154(b) by 0 days. days.

(21) Appl. No.: 15/476,924

(22) Filed: Mar. 31, 2017

(51) Int. Cl.
| G06T 15/50 | (2011.01) |
| G09B 9/00 | (2006.01) |
| G09B 9/02 | (2006.01) |
| G06F 17/50 | (2006.01) |

(52) U.S. Cl.
CPC .......... *G06T 15/50* (2013.01); *G06F 17/5009* (2013.01); *G09B 9/003* (2013.01); *G09B 9/02* (2013.01)

(58) Field of Classification Search
None
See application file for complete search history.

(56) References Cited

FOREIGN PATENT DOCUMENTS

| CA | 2922403 | 3/2015 |
| CA | 2847865 | 9/2015 |
| CA | 2888192 | 9/2015 |

OTHER PUBLICATIONS

"Thermal Rendering", Universitat Politecnica de Catalunya Barcelonetech Master in Innovation and Research in Informatics, pp. 1-55, Jun. 30, 2015 (Jun. 30, 2015).
"Model-Based Real-time Visualization of Realistic Three-Dimensional Heat Maps for Mobile Eye Tracking and Eye Tracking in Virtual Reality", Pfeiffer et al., Proceedings of the Ninth Biennial ACM Symposium on Eye Tracking Research & Applications, pp. 95-102, Mar. 2016 (Mar. 2016).

*Primary Examiner* — Michelle Chin
(74) *Attorney, Agent, or Firm* — Gowling WLG LLP; Benoit Yelle

(57) ABSTRACT

Method(s) and interactive simulation station(s) for improved heat modeling and rendering in an interactive computer simulation system. Considering inputs received on tangible instruments, a view point is defined for displaying heat-enhanced images. A non-static 3D mesh defines temperature-influenced virtual point(s) and comprises a base-texture and a heat-map texture. Rendering the 3D mesh is performed from the view point by 1) applying base imagery data of the base-texture over surfaces of the 3D mesh from base-texture coordinates (mapping the base imagery data on the 3D mesh); 2) from the heat-map texture, and for each temperature-influenced virtual point(s), loading a heat-propagation pattern from heat-map coordinates, shared with the base-texture coordinates, that selectively map the heat-propagation pattern on the 3D mesh; and 3) computing a heat-related intensity variation on the visible surface(s) from the heat-propagation pattern of each temperature-influenced virtual point(s).

20 Claims, 9 Drawing Sheets

3000

```
┌─────────────────────────────────────────────────────────────┐
│  Associating a base-texture to a 3D mesh defining base-texture │
│  coordinates that selectively map different regions of base imagery │
│      data over different surfaces of the 3D mesh;            │
│  Upon control of the virtual simulated element from an interactive │
│   computer simulation station, images of the 3D mesh rendered on a │
│   display of an interactive computer simulation station are altered by │
│       temperature-influenced virtual point(s) 3010           │
└─────────────────────────────────────────────────────────────┘
                              │
                              ▼
┌─────────────────────────────────────────────────────────────┐
│ Associating a heat-map texture to the 3D mesh defining, for each of │
│    the temperature-influenced virtual points, a heat-propagation │
│   pattern from heat-map coordinates, shared with the base-texture │
│   coordinates, that selectively map different regions thereof on the │
│   3D mesh, the heat-propagation pattern defining at least one portion │
│        of the images altered upon rendering 3020             │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  Upon loading of the 3D mesh at the simulation station following │
│       inputs from one or more tangible instruments thereof for │
│  controlling a virtual simulated element, rendering the images of the │
│    3D mesh on the display of the simulation station altered by the │
│       temperature-influenced virtual points considering the  │
│    corresponding portions of the images defined by the heat- │
│                  propagation pattern 3030                    │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Figure 3

HEAT RENDERING IN AN INTERACTIVE COMPUTER SIMULATION SYSTEM

TECHNICAL FIELD

The present invention relates to an interactive computer simulation system and, more particularly, to rendering heat-related information in the interactive computer simulation system.

BACKGROUND

Interactive computer simulation systems are used to train personnel on complex and/or risky tasks. In some training contexts, visual information is complemented with heat information emitted by simulated elements. Heat sensors (e.g., a Forward Looking Infra-Red (FLIR) sensors and/or night-vision devices) are provided to display images conveying the heat information. Of course, ideally, a perfect model of heat dissipation would be used to convey the heat information during an interactive computer simulation. However, the interactive computer simulation needs to be considered plausible for its training purposes (e.g., real-time or quasi real-time processing), which imposes constraints that limit the number of calculations performed and the amount of data treated in relation to heat dissipation. Yet, current methods of conveying the heat information are not perceived as plausible enough from the perspective of the trainee.

The present invention at least partly addresses this shortcoming by improving rendering of heat information (e.g., visually representing simulated heat-related data) during an interactive computer simulation while considering limits on capabilities on computer systems supporting the interactive computer simulation.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a first aspect, a method is provided for improved heat rendering in an interactive computer simulation system comprising a virtual simulated element in a computer generated environment. The method comprises, at the interactive computer simulation station, receiving inputs from one or more tangible instruments thereof for controlling the virtual simulated element in the computer generated environment. Considering the received inputs, the method follows with defining a view point, for a display of the interactive computer simulation station, in the computer generated environment. From the view point in the computer generated environment, the method continues with loading a non-static 3D mesh defining one or more temperature-influenced virtual points and comprising a base-texture and a heat-map texture an rendering the non-static 3D mesh, from the view point, for the display in the interactive computer simulation station. the rendering is performed by 1) applying base imagery data of the base-texture over visible surfaces of the non-static 3D mesh from base-texture coordinates that selectively map the base imagery data on the non-static 3D mesh; 2) from the heat-map texture, and for each of the one or more temperature-influenced virtual points, loading a heat-propagation pattern from heat-map coordinates, shared with the base-texture coordinates, that selectively map the heat-propagation pattern on the non-static 3D mesh; and 3) computing a heat-related intensity variation on at least some of the visible surfaces of the 3D mesh from the heat-propagation pattern of each of the one or more temperature-influenced virtual points.

Optionally, computing a heat-related intensity variation may comprise individually computing the heat-related intensity variation for each pixel of the visible surfaces considering the heat-propagation pattern of each of the one or more temperature-influenced virtual points.

In some embodiments, at least two temperature-influenced virtual points are provided and computing the heat-related intensity variation may then comprise computing a combined heat-related intensity variation for the heat-propagation pattern of each of the at least two temperature-influenced virtual points. Computing the combined heat-related intensity variation may then also further comprise individually computing the combined heat-related intensity variation for each pixel of the visible surfaces. Computing the combined heat-related intensity variation may yet also, alternatively or in addition, comprise considering a contribution from each of the at least two temperature-influenced virtual points together with a bounded temperature range associated to the heat-map texture.

The base-texture may be one of a visual texture of the non-static 3D mesh, a static light texture of the non-static 3D mesh, a decal texture of the 3D mesh, and a second heat-map texture of the non-static 3D mesh.

The heat-related intensity variation may be determined considering one or more temperature-limits for each of the one or more heat-influenced virtual points.

The display may be for displaying Forward Looking Infra-Red (FLIR) sensor-type images.

In accordance with a second aspect, a method for modeling, in an interactive computer simulation system, a non-static 3D mesh of a computer generated environment is provided. The computer generated environment comprises a virtual simulated element controlled at an interactive computer simulation station from one or more tangible instruments thereof. The method comprises associating a base-texture to the non-static 3D mesh defining base-texture coordinates that selectively map different regions of base imagery data over different surfaces of the non-static 3D mesh. Upon control of the virtual simulated element from the interactive computer simulation station, images of the non-static 3D mesh rendered on a display of interactive computer simulation station are altered by one or more temperature-influenced virtual points. The method also comprises associating a heat-map texture to the non-static 3D mesh defining, for each of the one or more temperature-influenced virtual points, a heat-propagation pattern from heat-map coordinates, shared with the base-texture coordinates, that selectively map different regions thereof on the non-static 3D mesh, the heat-propagation pattern defining at least one portion of the images altered upon rendering.

In certain embodiments, the method may further comprise providing a unique identifier to each of the one or more heat-influenced virtual points within the at least one geometric zone and/or specifying one or more temperature-limits for each of the one or more heat-influenced virtual points.

The base-texture may be one of a visual texture of the non-static 3D mesh, a static light texture of the non-static 3D mesh, a decal texture of the 3D mesh, and a second heat-map texture of the non-static 3D mesh.

The method may optionally further comprise, upon loading of the non-static 3D mesh at the interactive computer simulation station following inputs from the one or more tangible instruments thereof for controlling the virtual simulated element, rendering the images of the non-static 3D mesh on the display of the interactive computer simulation station altered by the one or more temperature-influenced virtual points considering the corresponding portions of the images defined by the heat-propagation pattern.

In accordance with a third aspect, an interactive computer simulation station, executing an interaction computer simulation is provided. The interactive computer simulation station comprises a display module, a tangible instruments module, a processing module and an image processing module comprising at least one graphical processing unit.

The display module comprises at least a display and is for displaying images of a computer generated environment of the interaction computer simulation. The tangible instruments module comprises one or more tangible instruments receiving inputs for controlling a virtual simulated element in the computer generated environment of the interaction computer simulation.

The processing module is for defining a view point, considering the received inputs, for the display of the interactive computer simulation station. The graphical processing unit renders the images, from the view point, for the display in the interactive computer simulation station. In order to do so, the processing module and/or the image processing module, from the view point in the computer generated environment, loads a non-static 3D mesh defining one or more temperature-influenced virtual points and comprising a base-texture and a heat-map texture, applies base imagery data of the base-texture over visible surfaces of the non-static 3D mesh from base-texture coordinates that selectively map the base imagery data on the non-static 3D mesh and, from the heat-map texture, and for each of the one or more temperature-influenced virtual points, loads a heat-propagation pattern from heat-map coordinates, shared with the base-texture coordinates, that selectively map the heat-propagation pattern on the non-static 3D mesh. The image processing module computes a heat-related intensity variation on at least some of the visible surfaces of the 3D mesh from the heat-propagation pattern of each of the one or more temperature-influenced virtual points.

In some embodiments, The graphical processing unit may compute the heat-related intensity variation for each pixel of the visible surfaces considering the heat-propagation pattern of each of the one or more temperature-influenced virtual points. At least two temperature-influenced virtual points may optionally be provided, in which case the graphical processing unit may compute a combined heat-related intensity variation for the heat-propagation pattern of each of the at least two temperature-influenced virtual points. The graphical processing unit may individually compute the combined heat-related intensity variation for each pixel of the visible surfaces. Alternatively or in addition, the graphical processing unit may compute the combined heat-related intensity variation considering a contribution from each of the at least two temperature-influenced virtual points together with a bounded temperature range associated to the heat-map texture.

The base-texture may be one of a visual texture of the non-static 3D mesh, a static light texture of the non-static 3D mesh, a decal texture of the 3D mesh, and a second heat-map texture of the non-static 3D mesh.

The heat-related intensity variation may be determined considering one or more temperature-limits for each of the one or more heat-influenced virtual points.

In some embodiments, the display may display Forward Looking Infra-Red (FLIR) sensor-type images.

BRIEF DESCRIPTION OF THE DRAWINGS

Further features and exemplary advantages of the present invention will become apparent from the following detailed description, taken in conjunction with the appended drawings, in which:

FIG. 3 is a flow chart of an exemplary method in accordance with an embodiment of the present invention;

DETAILED DESCRIPTION

Figure 1:
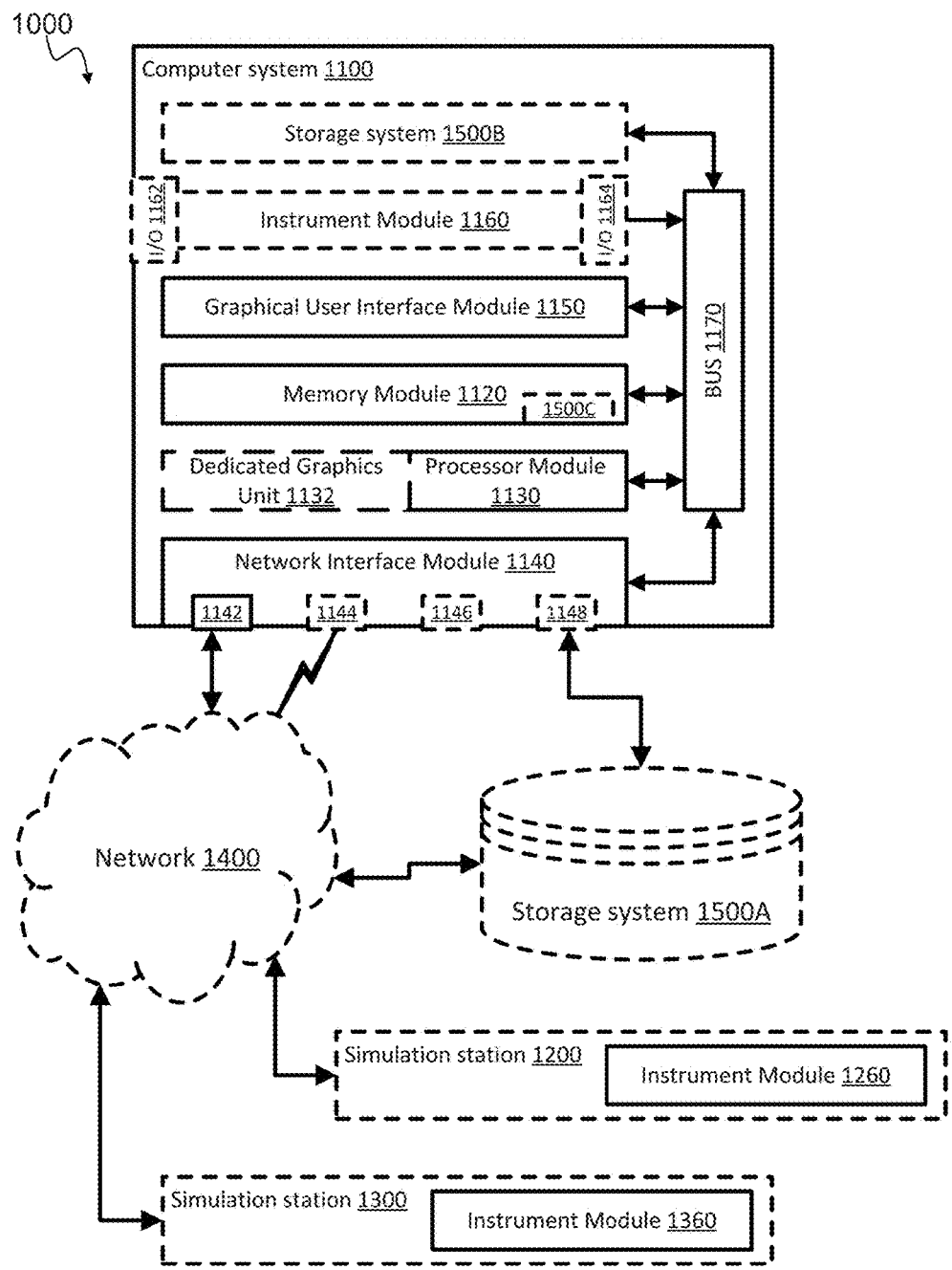
FIG. 1 is a logical modular view of an exemplary interactive computer simulation system in accordance with an embodiment of the present invention.

Reference is now made to the drawings in which FIG. 1 shows a logical modular view of an exemplary interactive computer simulation system 1000 in accordance with the teachings of the present invention. The interactive computer simulation system 1000 performs one or more interactive computer simulations. Each interactive computer simulation comprises one or more virtual simulated elements each representing an actual system (e.g., multiple virtual aircraft systems each representing an actual aircraft) in a computer generated environment. Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. The virtual simulated element, or simulated element, may be defined as a simulated system comprising multiple simulated dynamic sub-systems, or dynamic sub-systems. The simulated element is a virtual version that simulates, to the extent required by the interactive computer simulation, behavior of an actual system. Correspondingly, each simulated dynamic sub-systems of the simulated element is a virtual version, to the extent required but the interactive computer simulation, behavior of actual sub-systems of the actual system.

In the depicted embodiment of FIG. 1, the interactive computer simulation system 1000 comprises a computer system 1100 for modeling virtual elements of the computer generated environment as 3D meshes and/or rendering images of the 3D meshes from a view point in the computer generated environment. The interactive computer simulation system 1000 typically comprises one or more simulation stations 1200 and 1300 that each allow one or more users to interact to control a virtual simulated element in one of the interactive computer simulation(s) of the interactive computer simulation system 1000. The computer system 1100 and the simulation stations 1200 and 1300 may be connected via a network 1400, via direct connections or a mix of direct and network connections. In the depicted example of FIG. 1, the computer system 1100 is distinct from the simulation stations 1200, 1300 while, in some embodiments, the computer system 1000 may be integrated with one or more of the simulation stations 1200, 1300. The computer system 1100 may also be equipped to function as a simulation station. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

In the depicted example of FIG. 1, the computer system 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain expected realism of such immersive simulation. In some embodiments, each of the simulation stations 1200, 1300 comprise a processor module having a dedicated graphics processing unit similar to the dedicated graphics processing unit 1132. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the computer system 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the computer system 1100. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the computer system 1100 to perform routine as well as innovative steps related to the present invention.

The interactive computer simulation system 1000 comprises a storage system 1500 that may log dynamic data in relation to the dynamic sub-systems while the interactive computer simulation is performed. FIG. 1 shows examples of the storage system 1500 as a distinct database system 1500A, a distinct module 1500B of the computer system 1110 or a sub-module 1500C of the memory module 1120 of the computer system 1110. The storage system 1500 may also comprise storage modules (not shown) on the simulation stations 1200, 1300. The storage system 1500 may be distributed over different systems A, B, C and/or the simulations stations 1200, 1300 or may be in a single system. The storage system 1500 may comprise one or more logical or physical as well as local or remote hard disk drive (HDD) (or an array thereof). The storage system 1500 may further comprise a local or remote database made accessible to the computer system 1100 by a standardized or proprietary interface or via the network interface module 1140. The variants of storage system 1500 usable in the context of the present invention will be readily apparent to persons skilled in the art.

The computer system 1100 comprises a graphical user interface (GUI) module 1150 that ultimately allows modeling to be performed therethrough and/or rendered images to be displayed. The GUI module 1150 may comprise one or more display screens such as a wired or wireless flat screen, a wired or wireless touch-sensitive display, a tablet computer, a portable computer or a smart phone.

An Instructor Operating Station (IOS) may be provided for allowing various management tasks (not shown) to be performed in the interactive computer simulation system 1000. The tasks associated with the IOS allow for control and/or monitoring of one or more ongoing interactive computer simulations. For instance, the IOS may be used for allowing an instructor to participate to the interactive computer simulation and possibly additional interactive computer simulation(s). In some embodiments, the IOS is provided by the computer system 1100. In other embodiments, the IOS may be co-located with the computer system 1100 (e.g., within the same room or simulation enclosure) or remote therefrom (e.g., in different rooms or in different locations). Skilled persons will understand the many instances of the IOS may be concurrently provided in the interactive computer simulation system 1000. The IOS may provide a computer simulation management interface, which may be displayed on a dedicated IOS display module (not shown) or the GUI module 1150. The IOS could be located in close proximity with the computer system 1100, but may also be provided outside of the computer system 1100, in communication therewith.

When multiple simulation stations 1200 and 1300 are present in the system 1000, the IOS may present different views of the computer program management interface (e.g., to manage different aspects therewith) or they may all present the same view thereof. The computer program management interface may be permanently shown on a first of the screens of the IOS display module while a second of the screen of the IOS display module shows a view of the interactive computer simulation (i.e., adapted view considering characteristics of the second screen). The computer program management interface may also be triggered on the IOS, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation stations 1200 and/or 1300. A virtualized IOS may also be provided to the user (e.g., through the GUI module 1150) on a main screen, on a secondary screen or a dedicated screen. In some embodiments, a Brief and Debrief System (BDS) may also be provided. The BDS may be seen as a version of the IOS used during playback of recorded data only.

For instance, when IOS and/or BDS functionalities are provided through the computer system 1100, the GUI module 1150 may further be used to monitor and control one or more ongoing or recorded interactive computer simulation (e.g., triggering/monitoring events and/or selecting a perspective from which to view the ongoing or recorded chain of events of one or more interactive computer simulation).

Users of the interactive computer simulation system 1000 (e.g., users of the simulation stations 1200 and/or 1300, and/or computer system 1100) interact in the interactive computer simulation to control a virtual simulated element in a computer generated environment of the interactive computer simulation system 1000 (e.g., instructors or experts, trainees such as a pilot and co-pilot, a driver, an operator, a surgeon, a flight investigator, a training analyst, a flight analyst, etc.). Examples of virtual simulated elements include a simulated aircraft system, a simulated ground vehicle system, a simulated spacecraft or space station system, a simulated control room system, unmanned vehicle or drone, simulated human mannequin, etc. Examples of virtual dynamic sub-systems vary depending on the virtual simulated element. In the example of a simulated aircraft system, typical virtual dynamic sub-systems may include virtual hydraulic systems, virtual communication systems, virtual display systems, virtual wiring systems, virtual in-flight entertainment systems, virtual fuel systems, virtual lighting systems, virtual rudder system, virtual flap system, virtual landing gear system, etc. In the example of a simulated living system, typical virtual dynamic sub-systems may include blood system, digestive system immunity response system, lymphatic system, nervous system, biometric data such as temperature, blood pressure and other related physical data, etc. When a trainee or user is involved, actual measurements of biometric data may also be recorded (e.g., for subsequent correlation with other recorded data). For instance, biometric data from a pilot interacting in a computer simulation with one or more tangible instruments at the simulation station 1200 may be recorded (such as temperature, blood pressure and other related physical data). As a skilled person would appreciate, most virtual sub-systems are directly or indirectly affected by interactions of the user with one or more tangible instruments that allow the user to interact (e.g., provide different commands in order to control the virtual simulated element) during the interactive computer system in the computer generated environment. Some other virtual sub-systems may be affected by time elapsed during the interactive computer system and may further take into account the interactions of the user with one or more tangible instruments. For instance, in the example of a simulated aircraft system, a virtual aircraft structure subsystem may comprise one or more virtual mechanical components. Failure of any one of virtual mechanical components, or the virtual aircraft structure subsystem altogether, may be based on accumulated mechanical stress considering use time (e.g., number of flights and operating hours) and also based on maneuvers caused by the pilot manipulating the one or more tangible instruments.

The tangible instrument provided by the instrument modules 1160, 1260 and/or 1360 are tightly related to the element being simulated. In the example of the simulated aircraft system, typical instruments include various switches, levers, pedals and the like accessible to the user for controlling the aircraft in the interactive computer simulation. Depending on the type of simulation (e.g., level of immersivity), the tangible instruments may be more or less realistic compared to those that would be available in an actual aircraft. For instance, the tangible instrument provided by the modules 1160, 1260 and/or 1360 may replicate an actual aircraft cockpit where actual instruments found in the actual aircraft or physical interfaces having similar physical characteristics are provided to the user (or trainee). As previously describer, the actions that the user or trainee takes with one or more of the tangible instruments provided via the instrument module(s) 1160, 1260 and/or 1360 (modifying lever positions, activating/deactivating switches, etc.) allow the user or trainee to control the virtual simulated element in the interactive computer simulation. In the context of an immersive simulation being performed in the interactive computer simulation system 1000, the instrument module 1160, 1260 and/or 1360 would typically support a replicate of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiment, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the computer system 1000. The external input/output (I/O) module 1162 of the instrument module 1160, 1260 and/or 1360 may connect one or more external tangible instruments (not shown) therethrough. The external I/O module 1162 may be required, for instance, for interfacing the interactive computer simulation system 1000 with one or more tangible instrument identical to an Original Equipment Manufacturer (OEM) part that cannot be integrated into the computer system 1100 and/or the simulation station(s) 1200, 1300 (e.g., a tangible instrument exactly as the one that would be found in the actual system subject of the interactive simulation). The internal input/output (I/O) module 1162 of the instrument module 1160, 1260 and/or 1360 may connect one or more tangible instruments integrated with the instrument module 1160, 1260 and/or 1360. The I/O 1162 may comprise necessary interface(s) to exchange data, set data or get data from such integrated tangible instruments. The internal I/O module 1162 may be required, for instance, for interfacing the interactive computer simulation system 1100 with one or more integrated tangible instrument identical to an Original Equipment Manufacturer (OEM) part (e.g., a tangible instrument exactly as the one that would be found in the actual system subject of the interactive simulation). The I/O 1162 may comprise necessary interface(s) to exchange data, set data or get data from such integrated tangible instruments.

Figure 2:
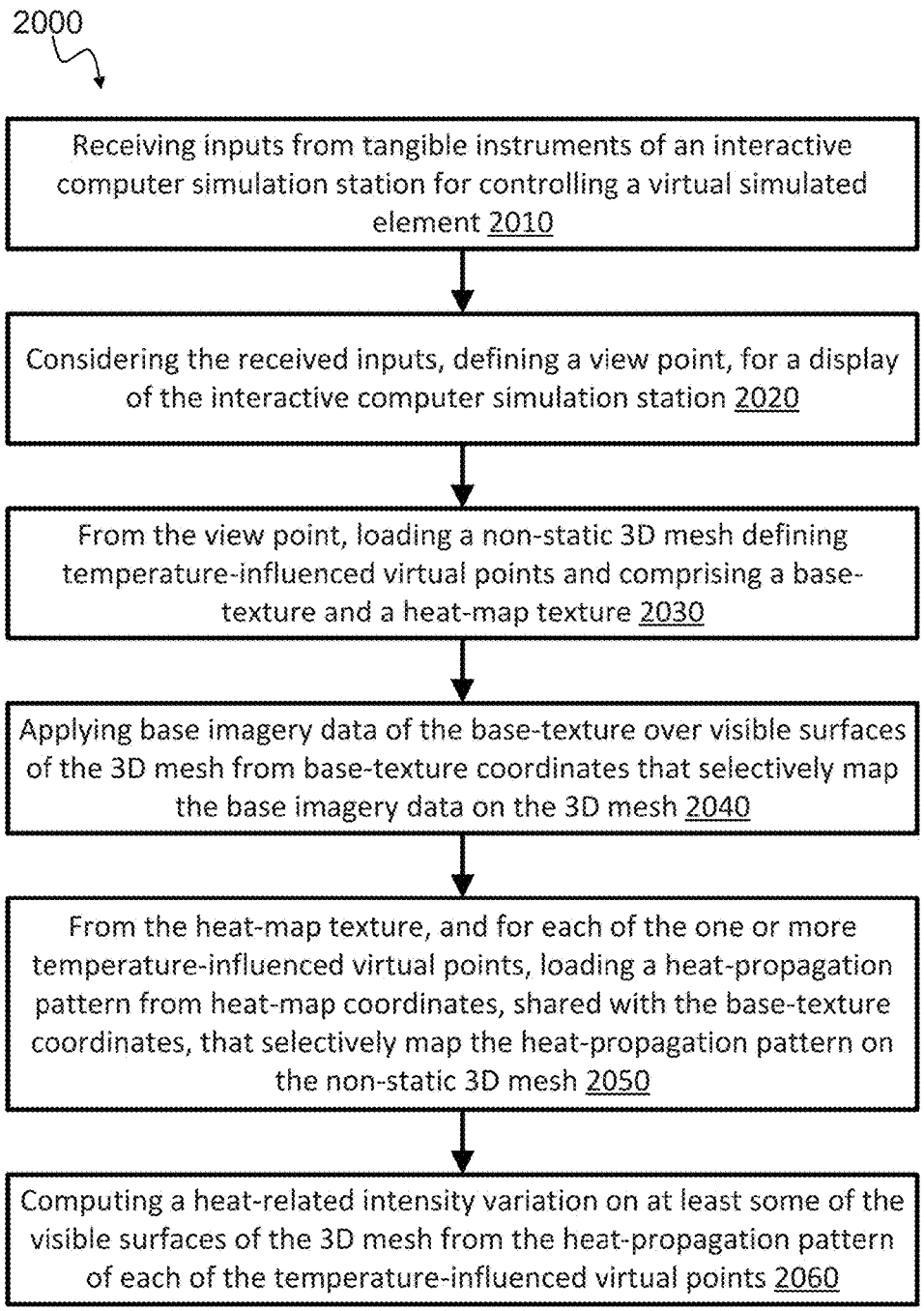
FIG. 2 is a flow chart of an exemplary method in accordance with an embodiment of the present invention.

Reference is now concurrently made to FIG. 1 and FIG. 2, which shows a flow chart of an exemplary method 2000 in accordance with the teachings of the present invention. The method 2000 is for improved heat rendering in the interactive computer simulation system 1000. The method 2000 comprises receiving 2010 inputs from one or more tangible instruments from the instrument modules 1160/1260/1360 for controlling a virtual simulated element in a computer generated environment. Considering the received inputs from 2010, the method 2000 continues with defining 2020 a view point, in the computer generated environment, for a display from the GUI 1150 (e.g., a FLIR display panel simulated through the GUI 1150) and/or an actual FLIR display panel provided as one of the tangible instruments of the instrument modules 1160/1260/1360. Defining 2020 may be performed by the processor module 1130. From the view point in the computer generated environment, a non-static 3D mesh is then loaded 2030 (e.g., loaded by the processor module 1030 from the storage module 1500 into the memory 1120). The non-static 3D mesh is, essentially, a 3D shape that is expected to non-statically visually convey heat-related information to the user and/or trainee in the interactive computer simulation system. The 3D shape would typically have a detectable texture in the visible spectrum (i.e., have defined visible simulated surfaces throughout the 3D shape (i.e., all surfaces) or on some area of the 3D shape). However, in some embodiments, the 3D shape may be camouflaged or otherwise provide an invisible source of heat or consumer of heat and/or 3D shape may be designed to selectively display a texture, which therefore does not always have a visible presence. The 3D shape may also have, in addition or alternatively, a detectable visible light texture (i.e., defined simulated reflectivity or other simulated optical characteristics). In the context of the present invention, in order to provide enhancement related to conveying heat-related information in interactive computer simulations, the 3D shape has at least two textures, one or two of which being related to heat information. The two textures share the mapping coordinates over the 3D shape for reduced computation needs in relation to the heat-related information to be displayed (e.g., reduced processing and/or memory requirements).

As such, the non-static 3D mesh is associated with a base-texture typically necessary for rendering non-heat enhanced images, which may be loaded at the same time as the 3D mesh. For instance, the base texture may be a visual texture of the non-static 3D mesh (as will be exemplified below), a static light texture of the non-static 3D mesh or a decal texture of the 3D mesh. It is also possible to use a micro-texture as the base-texture, but it may not provide as much computation synergy. A micro-texture may specific higher frequency variations on color or patterns to more plausibly depict different materials (e.g., grass field or ocean).

The non-static 3D mesh defines one or more temperature-influenced virtual points. The term "temperature-influenced virtual point" is used herein to describe what could also be referred to as a simulated hot spot or simulated cold spot. In general, in embodiments described herein, the temperature-influenced virtual point is defined as a region and does not represent a punctual simulated source of heat (and/or consumer of heat). The region may be a 2D region (e.g., surface having a heat propagation pattern) or may be a 3D region defined as such, for which it is possible to project one or more heat-propagation patterns on one or more 2D surfaces. The 3D region may also be defined by the heat-propagation pattern(s) from the 2D surface(s) (3D region built from projections). However, the temperature-influenced virtual point, in some embodiments, may be a simulated punctual source and/or consumer of heat. The simulated punctual source or consumer of heat may be located at a 3D location, which may or may not be on a 2D surface. Similarly to the region, the punctual source or consumer may define a heat-propagation pattern on one or more 2D surfaces. The simulated punctual source or consumer of heat may also be defined by the heat-propagation pattern(s) from the 2D surface(s) (3D location determined from projections).

As previously mentioned, heat information related to the temperature-influenced virtual points (hot spots and/or cold spots) is to be conveyed visually through the GUI 1150. In some embodiments when using monochrome display (e.g., FLIR display), presence of heat (relative to surrounding elements) is depicted as a brighter region or spot while absence of heat (relative to surrounding elements) is depicted as a darker region or spot. Of course, the opposite treatment may also be performed (i.e., brighter for colder and darker for hotter). In some other embodiments, one or more temperature ranges may be enhanced (e.g., made brighter or darker than surrounding elements) to be more easily distinguished. In some other embodiments, temperature-related information is conveyed in one color in one or more temperature range while the surrounding elements are in a different color (red for heat information and black and white for the rest). Of course, skilled persons will acknowledge that, in color displays, different colors may be associated to different temperature ranges.

For the purpose of visually conveying the heat-related information purpose, the non-static 3D mesh is associated with a heat-map texture (which may be loaded with the 3D mesh and/or the base-texture). As can be apparent to skilled persons, in some embodiments, the base texture may also be a second heat-map texture of the non-static 3D mesh. Examples of non-static 3D meshes that may be used in different types of interactive computer simulations include simulated vehicles of all types (typically having a simulated heat-dissipating engine), simulated industrial equipment, simulated rockets, simulated light sources, simulated heaters or coolers, simulated processors, simulated animals (including simulated human beings), etc. The non-static 3D mesh is expected to provide varying (i.e., non static) heat-related information (e.g., engine initially heats up, reaches a permanent regime temperature before cooling down when turned off). In some embodiments, the heat-related information is computed by the processor module 1130 and/or by a remote or local interactive computer simulation engine (not shown) while ensuring that other necessary dynamic simulated parameters are provided during the course of execution of the interactive computer simulation. However, the actual manner in which the varying temperature information is computed falls outside of the scope of the present invention.

The method 2000, after loading 2030 the non-static 3D mesh, continues with rendering 2040-2060 the non-static 3D mesh, from the view point, for the display (e.g., by the dedicated graphics unit 1132 of the processor module 1130 and/or the processor module 1130). Rendering 2040-2060 is performed by applying 2040 base imagery data of the base-texture over visible surfaces of the non-static 3D mesh from base-texture coordinates that selectively map the base imagery data on the non-static 3D mesh. For instance, the base imagery data (which is typically a 2D image) may be segmented in different regions which are selectively applied on surfaces of the 3D mesh (e.g. transformation of a 2D image on a 3D shape). A static light texture or a decal texture would also selectively map imagery data onto the 3D mesh.

Rendering 2040-2060 also involves, from the heat-map texture, and for each of the temperature-influenced virtual point(s), loading 2050 a heat-propagation pattern from heat-map coordinates. The heat map coordinates are shared with the base-texture coordinates. Sharing of the coordinates between the heat map texture and the base-texture allows for reduced computation needs in relation to the heat-related information to be displayed (e.g., reduced processing and/or memory requirements)|$_{[A1]}$. The heat map coordinates selectively map the heat-propagation pattern on the non-static 3D mesh. For instance, the heat-map texture may map a given heat-propagation pattern partially or completely onto one of the different regions of the base-texture.

Rendering 2040-2060 then continues with computing 2060 a heat-related intensity variation on at least some of the visible surfaces of the 3D mesh from the heat-propagation pattern of each of the one or more temperature-influenced virtual points. For instance, the heat-related intensity variation may be a gain applied to selected portions of the rendered image, making these portions lighter (i.e., brighter) when hotter and darker when cooler, thereby conveying heat-related information.

Computing 2060 the heat-related intensity variation would typically comprises individually computing the heat-related intensity variation for each pixel of the visible surfaces considering the heat-propagation pattern of each of the one or more temperature-influenced virtual points. Of course, skilled persons will readily recognize that the computing 2060 may be performed for groups of pixels and/or for mask areas of the images, which may be determined by configuration (i.e., more than one computing granularity mode made available for selection) and/or by limitations from capabilities of the dedicated graphics unit 1132 of the processor module 1130 and/or the processor module 1130 and/or the memory module 1120.

In some embodiments, there are at least two temperature-influenced virtual points provided. In such an example, computing 2060 the heat-related intensity variation comprises computing a combined heat-related intensity variation for the heat-propagation pattern of each of the temperature-influenced virtual points. As with the example of a single virtual point, computing the combined heat-related intensity variation may also be performed by individually computing the combined heat-related intensity variation for each pixel of the visible surfaces. While the combined computation may be as simply as adding the effect of the two points, in some embodiments, computing the combined heat-related intensity variation comprises considering a contribution from each of the at least two temperature-influenced virtual points together with a bounded temperature range associated to the heat-map texture. For instance, once a maximum or minimum simulated temperature value is reached for a given surface, the effect of an additional point should be null. In other instances, the contribution of a virtual point will be different depending on the initial simulated temperature. As an example, the temperature increase caused by a given heat-propagating virtual point from 100° may be different (i.e., smaller) than from 50° when other contributing factors remain constant.

As mentioned previously, examples of the base-texture include a visual texture of the non-static 3D mesh, a static light texture of the non-static 3D mesh, a decal texture of the 3D mesh, and a second heat-map texture of the non-static 3D mesh.

Skilled persons will recognize that the graphical user interface module may and, in most embodiments, is expected to display information that is unrelated to the present invention.

The rendering 2040-2060 is expected to be performed within certain performance parameters or limits. For instance, the image rate may be set to 5 or 6 images per second. Typically, 25 images per second or more are expected. Images per second is also sometimes noted as frames per second (fps). The fps of certain interactive computer simulation systems may also be set higher (e.g., 60) depending on the expected purpose of the training performed therein. As such, each image in the interactive computer simulation system is expected to be rendered within a limited time (e.g., no more than 25 ms to 200 ms for rendering a given image) while the interactive computer simulation is ongoing. rendering 2040-2060 is therefore typically performed at runtime of the interactive computer simulation in real-time processing or real-time priority processing.

In some embodiments, a simulation plan may further be loaded (not shown) from the storage system 1500 in relation the interaction computer simulation that involves the virtual simulated element. The simulation plan may comprise a training plan, a lesson plan or a scenario-based plan (e.g., with specific or dynamic objectives to be reached).

Reference is now concurrently made to FIG. 1 and FIG. 3, which shows a flow chart of an exemplary method 3000 for modeling, in an interactive computer simulation system, a non-static 3D mesh of a computer generated environment. As with the previous example related to FIGS. 1 and 2, the computer generated environment comprises a virtual simulated element controlled at an interactive computer simulation station from one or more tangible instruments thereof. The method 3000 comprises associating 3010 a base-texture to the non-static 3D mesh. Associating 3010 may be performed by the processing module 1130 through the GUI 1150 into the memory module 1120. The base-texture of the non-static 3D mesh defines base-texture coordinates that selectively map different regions of base imagery data over different surfaces of the non-static 3D mesh. As such, upon control of the virtual simulated element from the interactive computer simulation station, images of the non-static 3D mesh, rendered on a display of the interactive computer simulation station, are altered by one or more temperature-influenced virtual points. Examples of control of the simulated element and rendering of images have been provided with reference to the method 2000.

The method 3000 continues with associating 3020 a heat-map texture to the non-static 3D mesh. Associating 3020 may be performed by the processing module 1130 through the GUI 1150 into the memory module 1120. The heat-map texture defines, for each of the one or more temperature-influenced virtual points, a heat-propagation pattern from heat-map coordinates. As mentioned with reference to previously described examples, the heat-map coordinates are shared with the base-texture coordinates. The heat-map coordinates selectively map different regions thereof on the non-static 3D mesh. The heat-propagation pattern defines at least one portion of the images altered upon rendering. In some embodiments, the method 3000 also comprises providing a unique identifier to each of the one or more heat-influenced virtual points within the at least one geometric zone and/or specifying one or more temperature-limits for each of the one or more heat-influenced virtual points.

The base-texture may be one of a visual texture of the non-static 3D mesh, a static light texture of the non-static 3D mesh, a decal texture of the 3D mesh, and a second heat-map texture of the non-static 3D mesh.

Upon loading of the non-static 3D mesh at the interactive computer simulation station following inputs from the one or more tangible instruments thereof for controlling the virtual simulated element, the method 3000 may further comprise rendering 3030 the images of the non-static 3D mesh on the display of the interactive computer simulation station altered by the one or more temperature-influenced virtual points considering the corresponding portions of the images defined by the heat-propagation pattern. The rendering 3030 may be performed similarly, mutatis mutandis to the rendering 2040-2060 as previously exemplified.

Figure 4:
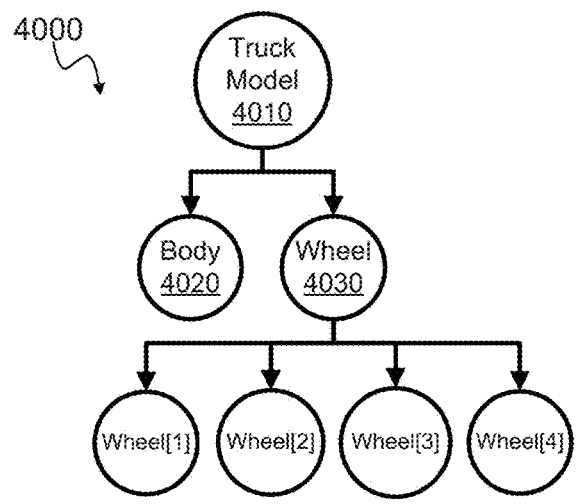
FIG. 4 is a logical graph of an exemplary 3D mesh in accordance with an embodiment of the present invention.
Figure 5:
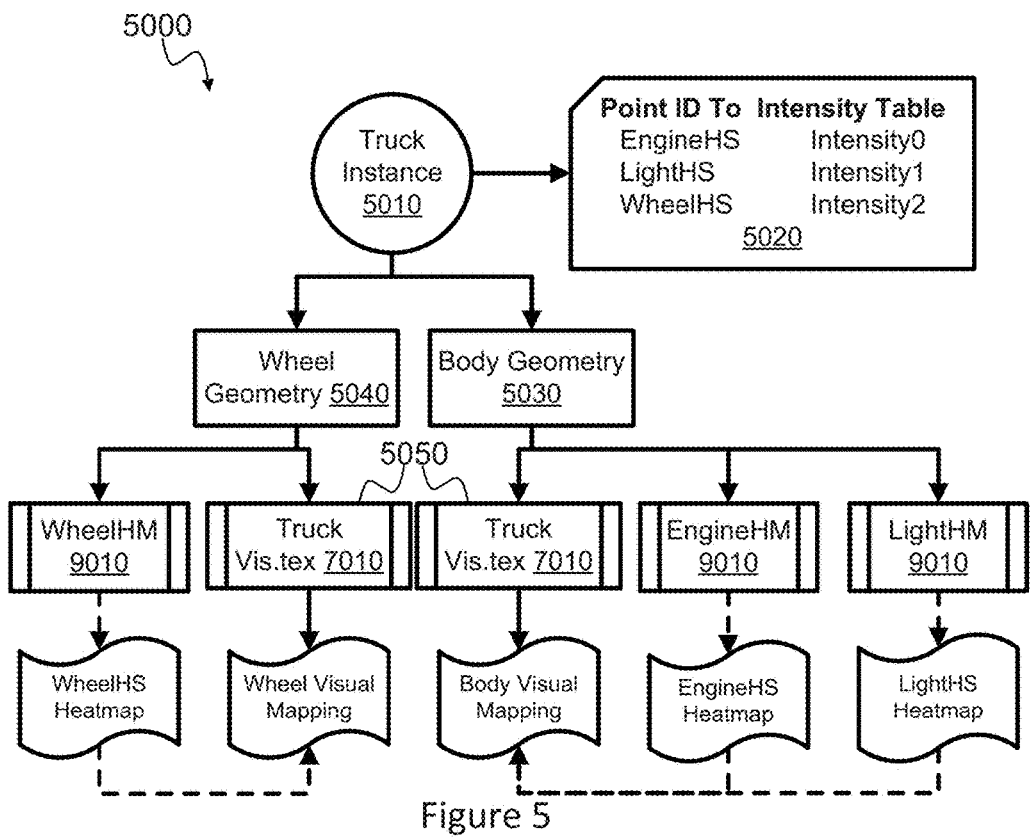
FIG. 5 is a logical graph of an exemplary 3D mesh associated with different textures in accordance with an embodiment of the present invention.

Reference is now concurrently made to FIG. 1 and FIGS. 4 to 10. FIG. 4 shows a logical graph 4000 of an exemplary non-static 3D mesh in accordance with an embodiment of the present invention. The non-static 3D mesh used to illustrate the teachings of the present invention in the example of FIG. 4 to 10 is a truck 3D mesh, as rendered on FIG. 6 conveying heat-related information in a rendered image 6000. The truck 3D mesh is modeled into 4010 by defining a truck body 4020 and defining a wheel 4030. The wheel 4030 is replicated into four distinct wheels in the model 4010, as can be seen on the graph 4000. It may be sufficient for the model 4010 of the truck 3D mesh to include a single wheel or two wheels replicated as necessary for defining a 3D shape of the non-static 3D mesh. FIG. 5 is a logical graph 5000 of one instance 5010 of the exemplary truck 3D mesh associated with different textures in accordance with an embodiment of the present invention. On FIG. 5, the truck instance 5010 of the truck model 4010 is associated to a table 5020 linking each of the temperature-influenced virtual points of the truck instance 5010 with an intensity value. The intensity values, in the example of FIGS. 4 to 10, are computed in accordance with events of the interactive computer simulation (e.g., by the processing module 1130 and/or the simulation engine) and are applied to the truck instance 5010 through the table 5020. The truck instance 5010 comprises a body geometry 5030 and a wheel geometry 5040. Geometries such as 5030 and 5040 are typically provided as connectivity graphs establishing rendering surfaces (e.g., triangles) for the 3D mesh. The wheel body 5040 geometry is associated to a single visual texture 5050 ("truck Vis.tex"), which is illustrated as an image 7010 on FIG. 7. X and Y axis have been added on FIG. 7 to 10 to show an exemplary texture coordinate system, but these axes would typically not be part of their respective textures. As can be appreciated, the image 7010 of the visual texture defines different "texture" regions comprising imagery data that is mapped onto a 3D shape of the truck 3D mesh. The different texture regions are identified by logical dotted boxes 7020, 7022, 7024, which will be referred to directly as the texture regions themselves for sake of simplicity.

Figure 6:
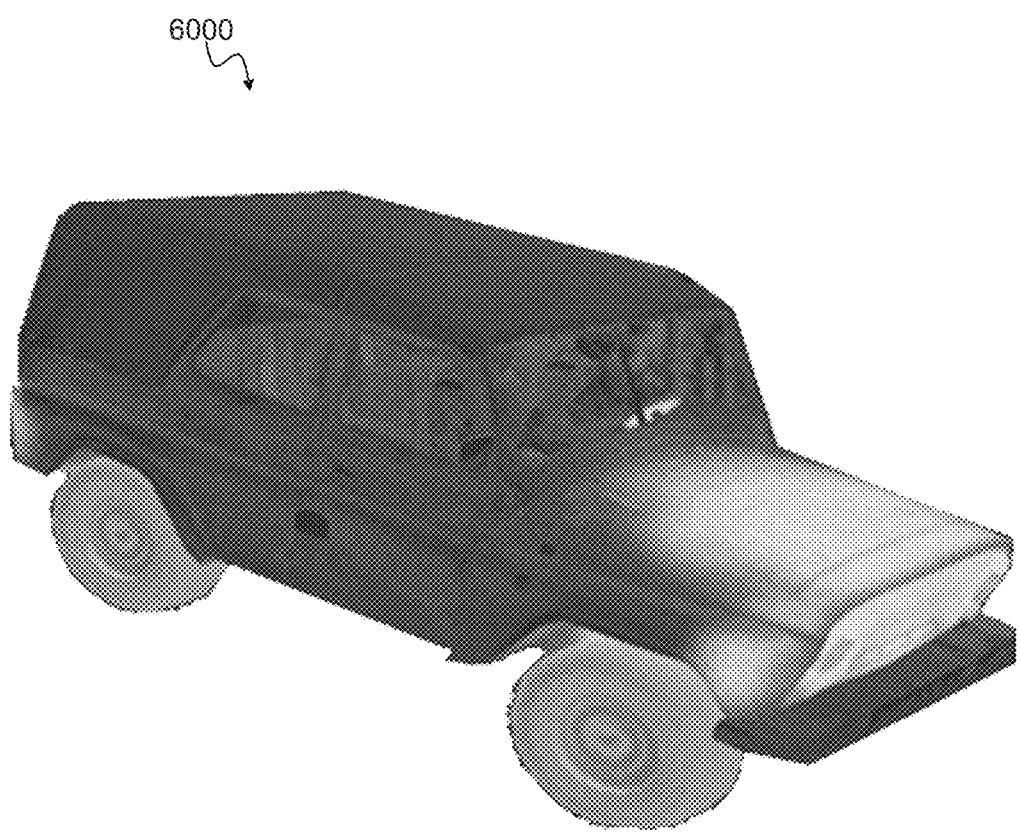
FIG. 6 is a rendered image depicted a heat-affected 3D mesh in accordance with an embodiment of the present invention.
Figure 7:
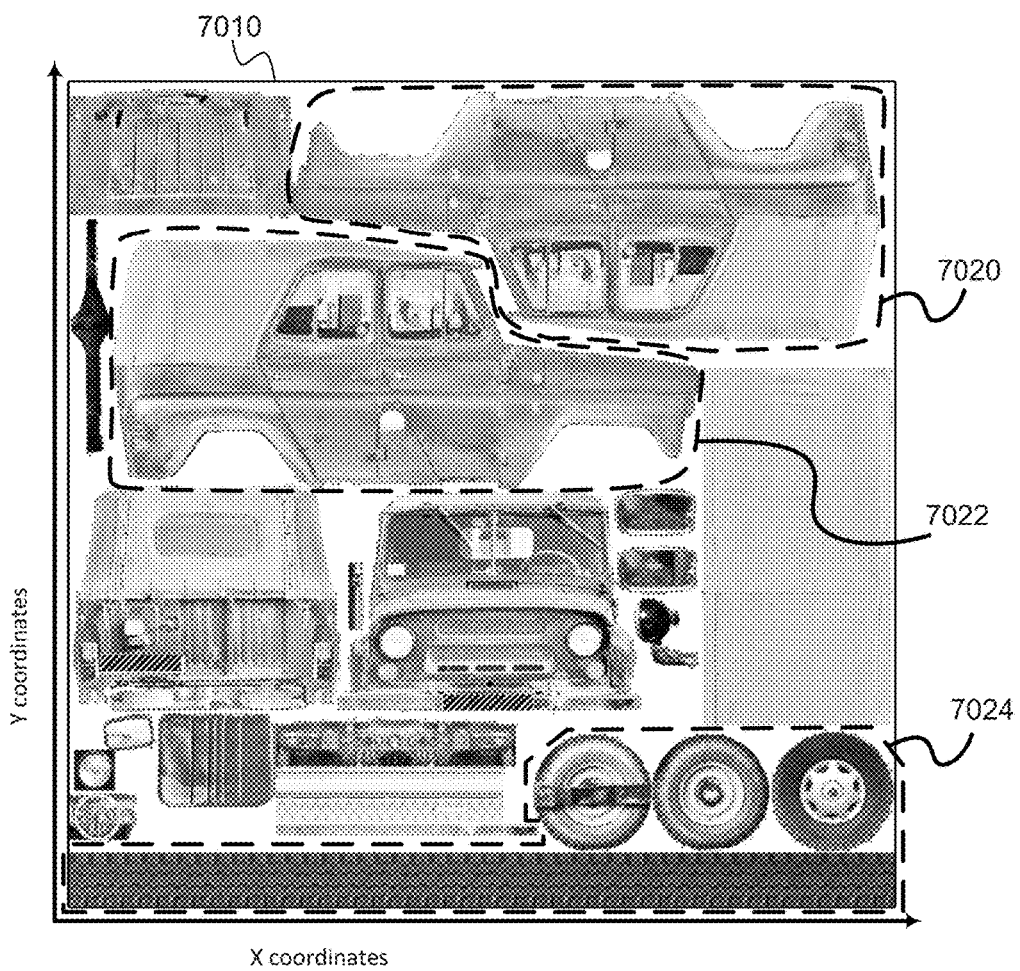
FIG. 7 is an image of an exemplary visual texture for the 3D mesh in accordance with an embodiment of the present invention.

For instance, when considering the rendered image 6000, the region 7020 is mapped to a right side of the truck instance 5010. Region 7022 is not visible on the image 6000 (being the left side of the truck instance 5010). Region 7024 is mapped more than once over each of the wheels of the truck instance 5010. FIG. 6 shows the rendered image 6000 depicting the truck instance 5010 as an example of a heat-affected 3D mesh in accordance with an embodiment of the present invention, which provides one example of the end result on the exemplary truck 3D mesh, in isolation from expected elements from the computer generated environment.

Figure 8:
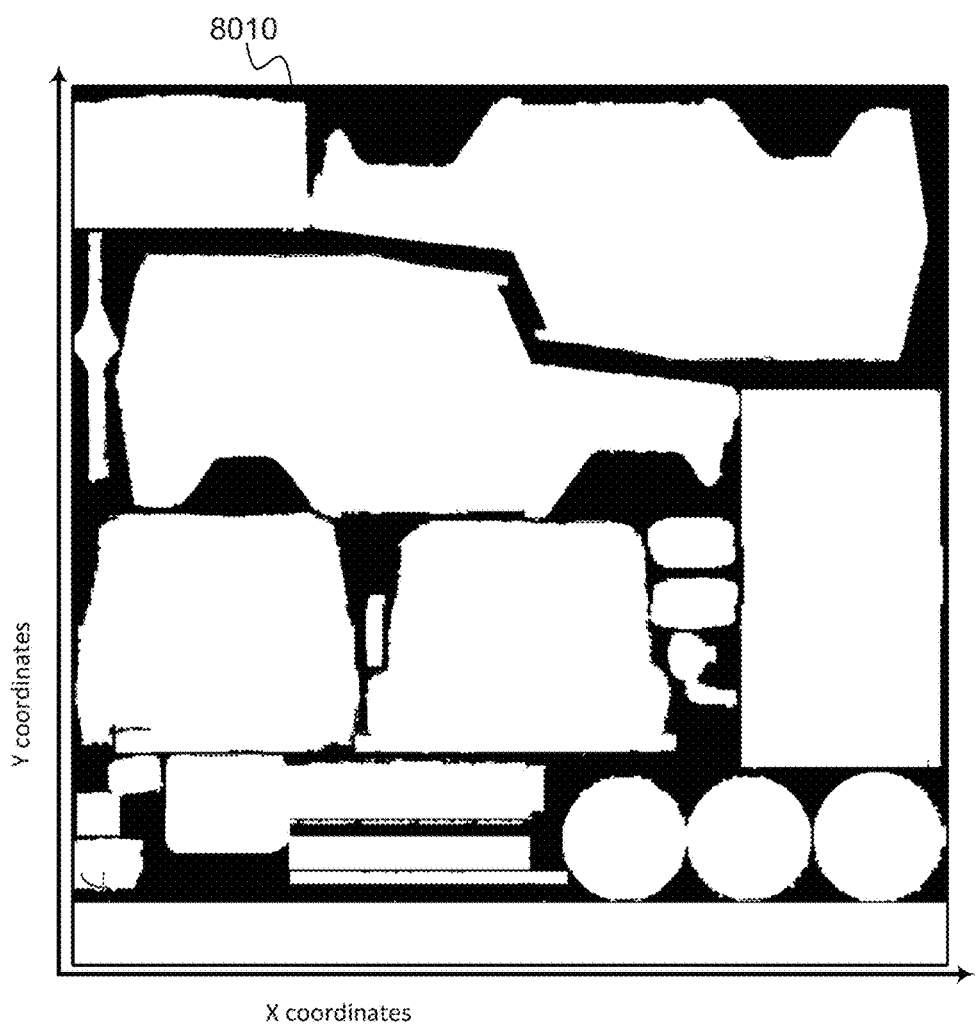
FIG. 8 is an image of an exemplary mask for the visual texture in accordance with an embodiment of the present invention.
Figure 9:
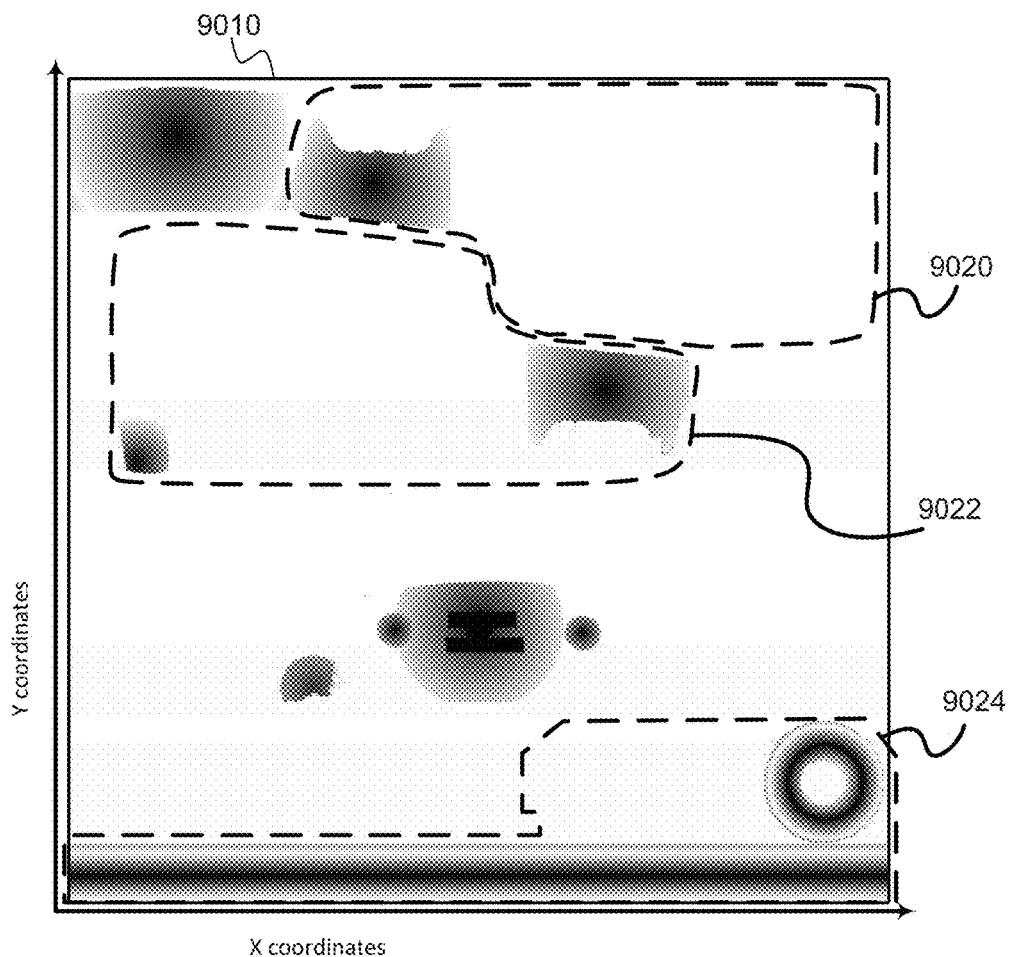
FIG. 9 is an image of the mask complemented with an exemplary heat-map texture in accordance with an embodiment of the present invention.
Figure 10:
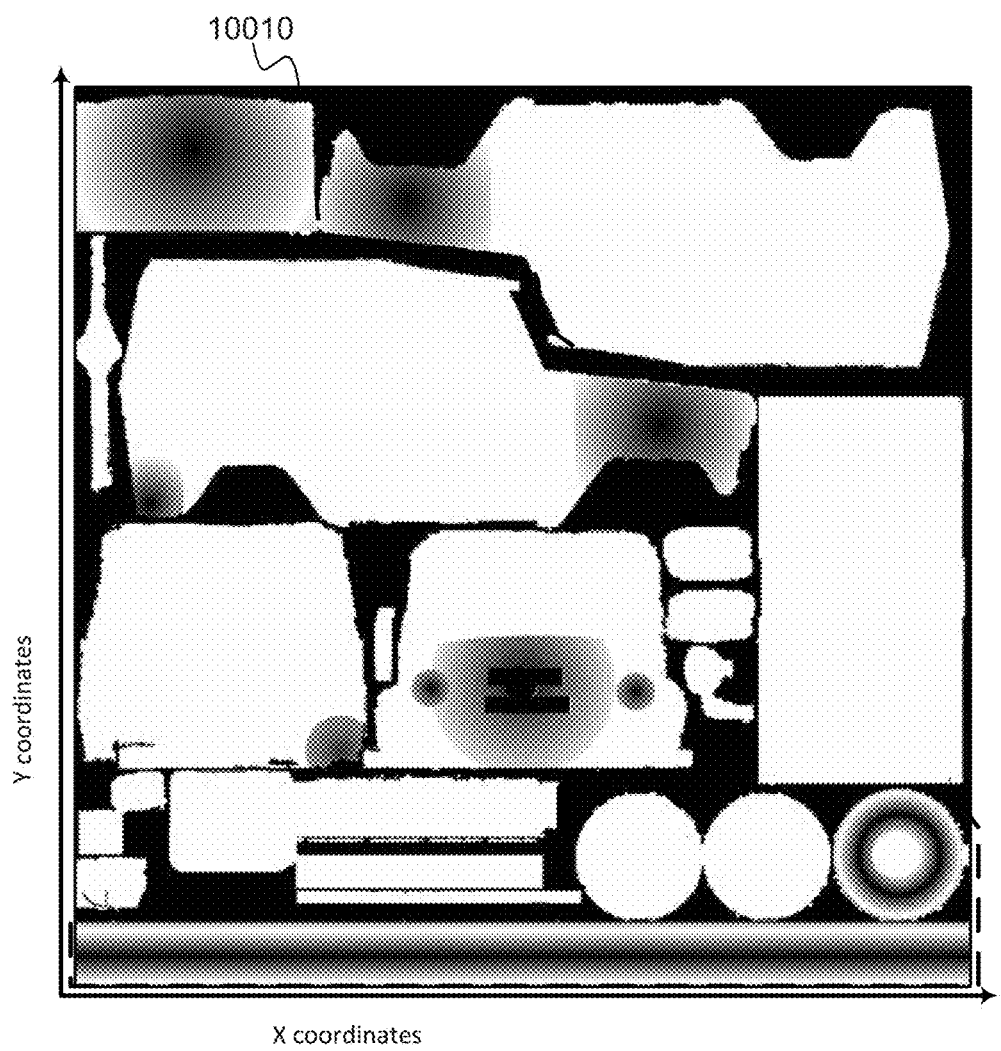
FIG. 10 is an image of the heat-map texture without the mask in accordance with an embodiment of the present invention.

FIG. 8 shows an image 8010 of an exemplary mask for image 7010 of the visual texture corresponding to regions thereof not used over the 3D geometries 5040 and 5030. FIG. 9 is an image 9010 of an exemplary heat-map texture in accordance with an embodiment of the present invention. FIG. 10 shows a mask identical to the mask 8010 from FIG. 8 complemented with the image 9010 of the heat-map texture. As can be appreciated, the mask 8010 may not be necessary. However, in some other instances, the heat-map texture image 9010 may provide a different mask (e.g., one or more regions of the heat map may be outside of the regions used for the visual texture, but still within the coordinates thereof).

The images 7010, 8010 and/or 9010 as well as the logical views 4000 and 5000 may be provided by the graphical user interface module 1150, at once or at different times, in one or more portions of the GUI. The graphical user interface module 1150 may therefore be used to design the truck model 4010 in accordance with the teachings of the present invention.

As can be appreciated, the image 9010 of the heat map texture defines different heat regions providing heat-propagation patterns that are mapped onto the 3D shape of the truck 3D mesh. The different heat regions are identified by logical dotted boxes 9020, 9022, 9024, which will be referred to directly as the heat regions themselves for sake of simplicity. As can be seen on FIG. 9, the heat regions 9020, 9022 and 9024 match corresponding texture regions 7020, 7022 and 7024 on the image 7010 of the visual texture 5050. As such, coordinates used to map the texture regions 7020, 7022 and 7024 can be used "as-is" for mapping the heat regions 9020, 9022 and 9024. In the example of FIGS. 4 to 10, different heat-propagation patterns are depicted on the image 9010 as areas filled with shading patterns and/or a solid colors. Different patterns will allow to properly convey attenuation in the intensity of the heat-related information in the rendered images. The heat-propagation patterns may be designed or modeled using drawings tools (e.g., 3d painter tools, as can be readily appreciated from the image 9010) and/or modeled or designed programmatically. For instance, the truck model 4010 may specify that an engine is positioned at the front thereof. Provided that heat-related information can be obtained (e.g., concerning the heat generation properties of the engine), the heat-propagation patterns may be computed by projection of the generated heat to corresponding surfaces of one or more 3D geometries of the 3D mesh.

In some embodiments, a heat map is created an 8-bit luminance texture. It is possible to link each heat map texture implicitly to a base texture by reusing a common name (or other identifier) with a specific component selector. For example, for a base texture named D601_S001_T001_truck, the heat map may be named D601_S059_T001_truck. If a second heat map was needed, and mapped on geometry that uses the same base texture, the name of the second heat map may be D601_S059_T002_truck.

As exemplified herein, heat map textures implicitly share the texture coordinates of the base texture they are associated with. Heat maps are thus not using a distinct texture layer. Specifically, a geometry having applied thereon a heat map by the image generator does not have specific texture coordinates for the heat map. In some embodiments, a specific heat map texture can be reused by multiple hot spots. For example, the truck instance 5010 has four wheels, which are modeled as four independent hot spots. The heat generation pattern of each wheel is likely to be identical. In such a case, a modeler would be expected to create a single 8-bit heat map texture (represented as the region 9024) to be used for simulating each of the four wheel hot spots. The link between the geometry of each wheel and the shared heat map texture may be specified explicitly in the model 4010.

When multiple geometries share the same texture space, and when a heat map is applied to the texture space, the modeler may divide the geometry into multiple model zones and specify how the heat map metadata is to be selectively applied to the geometries sharing that texture space. For instance, for the truck instance 5010. The heat map texture specifies the heat signature of the engine, at the front of the body. However, the engine is sufficiently hot that it would also cause heat on the front wheels of the truck, but not on the rear wheels. To model this effect, a second heat map may be created, showing heat on the wheel, which correspond to the region 9024. The front wheels in the model 4010 may therefore be isolated from the rear wheels, and the heat map applied only on those front wheels.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for improved heat rendering in an interactive computer simulation system comprising a virtual simulated element in a computer generated environment, the method comprising:
   at the interactive computer simulation station, receiving inputs from one or more tangible instruments thereof for controlling the virtual simulated element in the computer generated environment;
   considering the received inputs, defining a view point, for a display of the interactive computer simulation station, in the computer generated environment;
   from the view point in the computer generated environment, loading a non-static 3D mesh defining one or more temperature-influenced virtual points and comprising a base-texture and a heat-map texture; and
   rendering the non-static 3D mesh, from the view point, for the display in the interactive computer simulation station by:
      applying base imagery data of the base-texture over visible surfaces of the non-static 3D mesh from base-texture coordinates that selectively map the base imagery data on the non-static 3D mesh;
      from the heat-map texture, and for each of the one or more temperature-influenced virtual points, loading a heat-propagation pattern from heat-map coordinates, shared with the base-texture coordinates, that selectively map the heat-propagation pattern on the non-static 3D mesh; and
      computing a heat-related intensity variation on at least some of the visible surfaces of the 3D mesh from the heat-propagation pattern of each of the one or more temperature-influenced virtual points.

2. The method of claim 1, wherein computing a heat-related intensity variation comprises individually computing the heat-related intensity variation for each pixel of the visible surfaces considering the heat-propagation pattern of each of the one or more temperature-influenced virtual points.

3. The method of claim 1, wherein at least two temperature-influenced virtual points are provided and computing the heat-related intensity variation comprises computing a combined heat-related intensity variation for the heat-propagation pattern of each of the at least two temperature-influenced virtual points.

4. The method of claim 3, wherein computing the combined heat-related intensity variation comprises individually computing the combined heat-related intensity variation for each pixel of the visible surfaces.

5. The method of claim 3, wherein computing the combined heat-related intensity variation comprises considering a contribution from each of the at least two temperature-influenced virtual points together with a bounded temperature range associated to the heat-map texture.

6. The method of claim 1, wherein the base-texture is one of a visual texture of the non-static 3D mesh, a static light texture of the non-static 3D mesh, a decal texture of the 3D mesh, and a second heat-map texture of the non-static 3D mesh.

7. The method of claim 1, the heat-related intensity variation is determined considering one or more temperature-limits for each of the one or more heat-influenced virtual points.

8. The method of claim 1, wherein the display is display Forward Looking Infra-Red (FLIR) sensor-type images.

9. A method for modeling, in an interactive computer simulation system, a non-static 3D mesh of a computer generated environment comprising a virtual simulated element controlled at an interactive computer simulation station from one or more tangible instruments thereof, the method comprising:
   associating a base-texture to the non-static 3D mesh defining base-texture coordinates that selectively map different regions of base imagery data over different surfaces of the non-static 3D mesh, wherein, upon control of the virtual simulated element from the interactive computer simulation station, images of the non-static 3D mesh rendered on a display of interactive computer simulation station are altered by one or more temperature-influenced virtual points; and
   associating a heat-map texture to the non-static 3D mesh defining, for each of the one or more temperature-influenced virtual points, a heat-propagation pattern from heat-map coordinates, shared with the base-texture coordinates, that selectively map different regions thereof on the non-static 3D mesh, the heat-propagation pattern defining at least one portion of the images altered upon rendering.

10. The method of claim 9, further comprising:
providing a unique identifier to each of the one or more heat-influenced virtual points within the at least one geometric zone; and
specifying one or more temperature-limits for each of the one or more heat-influenced virtual points.

11. The method of claim 9, wherein the base-texture is one of a visual texture of the non-static 3D mesh, a static light texture of the non-static 3D mesh, a decal texture of the 3D mesh, and a second heat-map texture of the non-static 3D mesh.

12. The method of claim 9, further comprising, upon loading of the non-static 3D mesh at the interactive computer simulation station following inputs from the one or more tangible instruments thereof for controlling the virtual simulated element, rendering the images of the non-static 3D mesh on the display of the interactive computer simulation station altered by the one or more temperature-influenced virtual points considering the corresponding portions of the images defined by the heat-propagation pattern.

13. An interactive computer simulation station, executing an interaction computer simulation, comprising:
a display module, comprising at least a display, for displaying images of a computer generated environment of the interaction computer simulation;
a tangible instruments module comprising one or more tangible instruments receiving inputs for controlling a virtual simulated element in the computer generated environment of the interaction computer simulation;
a processing module for, considering the received inputs, defining a view point, for the display of the interactive computer simulation station;
an image processing module comprising at least one graphical processing unit, for rendering the images, from the view point, for the display in the interactive computer simulation station, that:
from the view point in the computer generated environment, loads a non-static 3D mesh defining one or more temperature-influenced virtual points and comprising a base-texture and a heat-map texture;
applies base imagery data of the base-texture over visible surfaces of the non-static 3D mesh from base-texture coordinates that selectively map the base imagery data on the non-static 3D mesh;
from the heat-map texture, and for each of the one or more temperature-influenced virtual points, loads a heat-propagation pattern from heat-map coordinates, shared with the base-texture coordinates, that selectively map the heat-propagation pattern on the non-static 3D mesh; and
computes a heat-related intensity variation on at least some of the visible surfaces of the 3D mesh from the heat-propagation pattern of each of the one or more temperature-influenced virtual points.

14. The interactive computer simulation station of claim 13, wherein the graphical processing unit computing the heat-related intensity variation for each pixel of the visible surfaces considering the heat-propagation pattern of each of the one or more temperature-influenced virtual points.

15. The interactive computer simulation station of claim 13, wherein at least two temperature-influenced virtual points are provided and wherein the graphical processing unit computes a combined heat-related intensity variation for the heat-propagation pattern of each of the at least two temperature-influenced virtual points.

16. The interactive computer simulation station of claim 15, wherein the graphical processing unit individually computes the combined heat-related intensity variation for each pixel of the visible surfaces.

17. The interactive computer simulation station of claim 15, wherein the graphical processing unit computes the combined heat-related intensity variation considering a contribution from each of the at least two temperature-influenced virtual points together with a bounded temperature range associated to the heat-map texture.

18. The interactive computer simulation station of claim 13, wherein the base-texture is one of a visual texture of the non-static 3D mesh, a static light texture of the non-static 3D mesh, a decal texture of the 3D mesh, and a second heat-map texture of the non-static 3D mesh.

19. The interactive computer simulation station of claim 13, the heat-related intensity variation is determined considering one or more temperature-limits for each of the one or more heat-influenced virtual points.

20. The interactive computer simulation station of claim 13, wherein the display is display Forward Looking Infra-Red (FLIR) sensor-type images.

* * * * *